INVENTOR.
GORDON C. RUSSELL

June 29, 1965   G. C. RUSSELL   3,191,725
CONNECTING STRUCTURE
Filed Oct. 18, 1962   3 Sheets-Sheet 2

INVENTOR.
GORDON C. RUSSELL
BY
Agent

June 29, 1965  G. C. RUSSELL  3,191,725
CONNECTING STRUCTURE
Filed Oct. 18, 1962  3 Sheets-Sheet 3
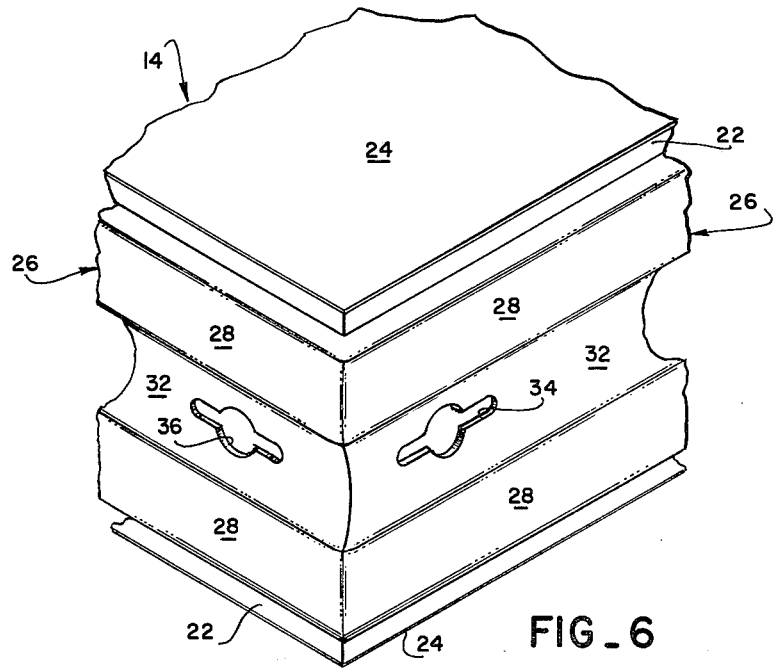
FIG_6
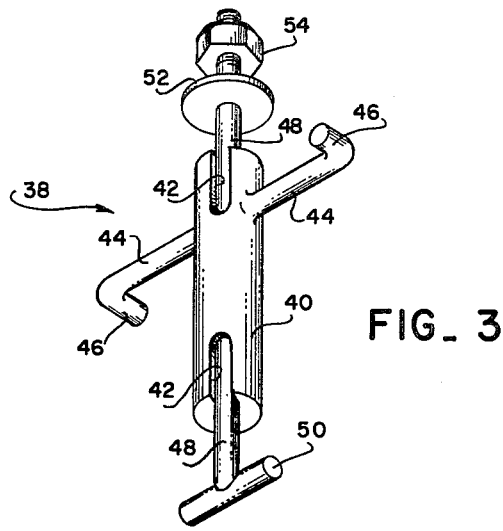
FIG_3
INVENTOR.
GORDON C. RUSSELL
BY
George C. Sullivan
Agent

United States Patent Office 3,191,725
Patented June 29, 1965

3,191,725
CONNECTING STRUCTURE
Gordon C. Russell, Studio City, Calif., assignor to Lockheed Aircraft Corporation, Los Angeles, Calif.
Filed Oct. 18, 1962, Ser. No. 231,527
7 Claims. (Cl. 189—34)

This invention relates to new and improved connecting devices and structures employed to connect panels to channels serving a structural function.

A number of different types of rigid building panels have been developed in the past. It has been the intention of those developing such panels to provide structures which would replace conventionally constructed walls, floors, ceilings and the like. It has been considered that if such panels could be used in buildings a considerable cost saving could be achieved since it is well known the conventional types of construction are relatively expensive.

One major factor which has tended to limit the use of rigid building panels in place of conventional construction has been the problem of how to connect and mount these panels so that they are assembled into a useable building structure. This problem concerns not only the problem of connecting such panels to one another, but the problem of connecting such panels to rigid metal members serving various different structural purposes. A connecting structure or device for use in connecting a building panel to a structural member such as a channel preferably must have a number of distinguishing characteristics.

Such a connecting device must be relatively inexpensive since one of the prime objects of using structural panels instead of classical construction is to achieve an economic advantage. Such a connecting device must also be relatively simple so that it does not require expensive, skilled labor in order for it to be utilized. Preferably, such a device should also be of a category enabling it to be quickly and easily disassembled since it is contemplated that building panels will be used with buildings of a type intended to be periodically dismantled and moved to another location. A connecting device for use with such panels should, of course, be capable of connecting them to channels so as to form connections or joints which are sufficiently strong for virtually all practical purposes.

An object of the present invention is to provide new and improved connecting devices and/or structures for use in connecting panels to structural channels. A further object of this invention is to provide assemblies of such structures, panels and channels. Other objects of this invention are to provide devices or structures of this type which are relatively inexpensive; which may be easily and conveniently used; which are capable of being easily and quickly disassembled; and which are capable of being employed so as to adequately hold a panel with respect to a channel.

Further objects of this invention as well as many specific advantages of it will be more fully apparent from a detailed consideration of the remainder of this specification, the appended claims, and the accompanying drawings in which:

FIGURE 3 is an isometric view of a connecting structure as shown in the preceding figures;

FIGURE 6 is an isometric view illustrating the construction of a panel employed in a connecting assembly or joint of this invention.

The accompanying drawings are primarily intended so as to clearly illustrate for explanatory purposes the nature of certain presently preferred forms of a connecting joint or assembly of this invention and of a presently preferred connecting structure of this invention. Those skilled in the building art will realize that the precise structures shown may be modified through the use of routine engineering skill without departing from the inventive features set forth in the appended claims.

As an aid to understanding this invention, it can be stated in essentially summary form that it concerns connecting structures, each of which has a rigid tube supporting a pair of extending locking arms. This tube also carries a bolt, one end of which is adapted to be secured with respect to a panel. The structure consisting of the tube and the bolt is used with a structural channel and a panel, both of which have openings intended to receive at least one of the arms and the end of the bolt. With this type of construction, the panel is connected by the connecting structure so as to be held with respect to the channel, forming what may be referred to as a connecting assembly or joint.

Figure 1:
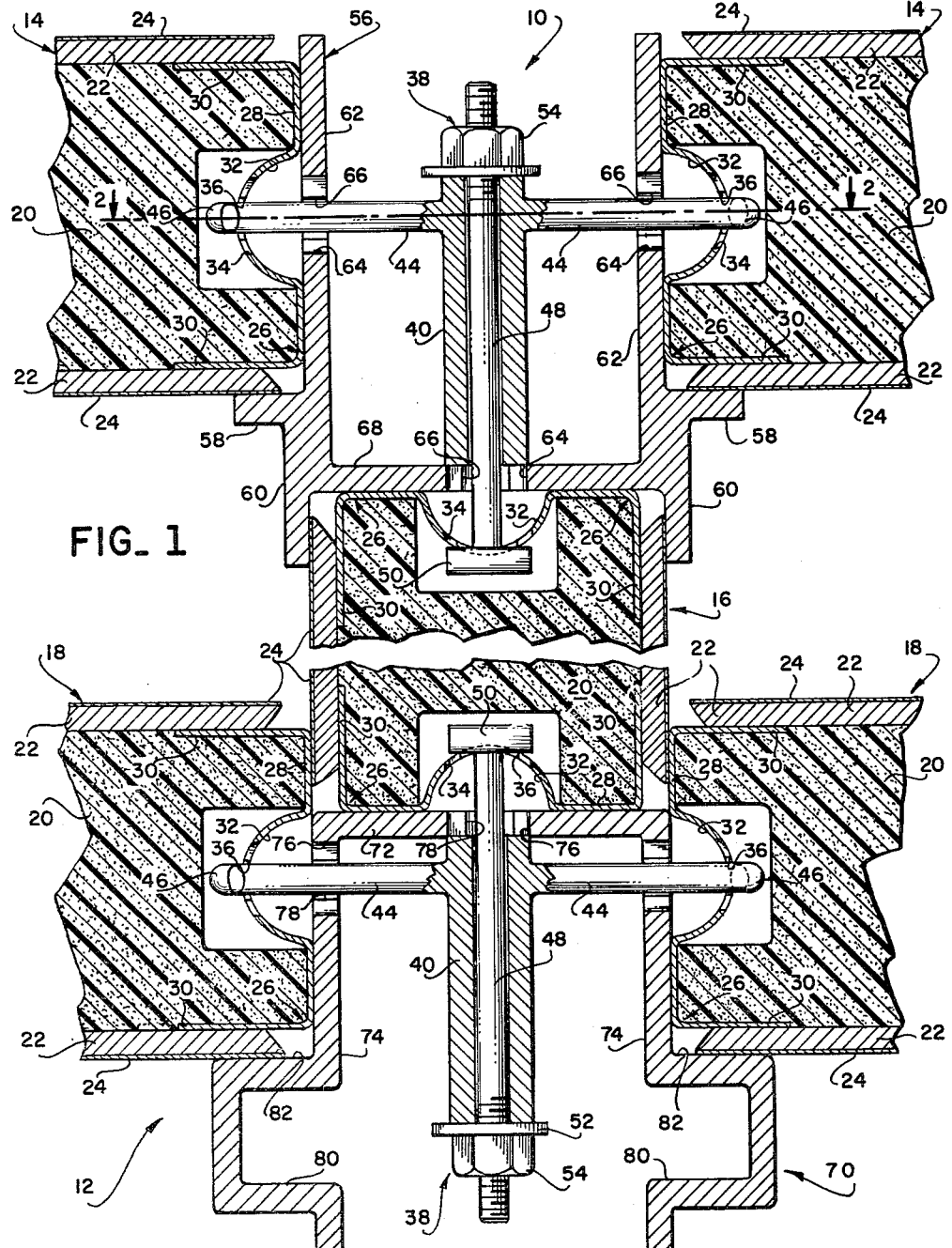
FIGURE 1 is a cross-sectional view showing the use of connecting structures of the present invention.

This type of structure can be more fully explained by referring to the accompanying drawings. In FIGURE 1, there are shown connecting joints or assemblies 10 and 12 formed in accordance with this invention. These joints 10 and 12 are employed so as to hold rigid roof panels 14 with respect to a rigid wall panel 16 and with respect to rigid floor panels 18. All of these panels 14, 16 and 18 are identically constructed.

The construction of them is best seen from a consideration of both FIGURE 1 and FIGURE 6 of the drawing. Each of the panels 14, 16 and 18 has a core 20 to the sides of which there are attached side members 22. These side members may be surmounted by an adherent protective film 24 if this is desired. Preferably, the core 20 in each of the panels 14, 16 and 18 is of a low weight cellular character. Thus the cores 20 can be formed of expanded polyurethane, polystyrene or the like; they may also consist of rigid paper or metal structures of a known type. Since the side members 22 are primarily designed for protective purposes in order to protect the cores 20 against damage, they may be formed of a number of different materials such as common plywood, metal, so-called fiberboard, rigid sheets of various plastics such as polyurethane or the like. When the film 24 is used it may consist of any type of protective coating such as a phenolic or like resinous coating.

Each of the panels 14, 16 and 18 also includes a rigid, preferably metal, edge channel 26 having essentially a U-shape. Each of these channels 26 includes a base 28 carrying ends 30 which project parallel to the sides 22 and which fit closely against these sides. The ends 30 are preferably secured to at least the sides 22 through the use of a conventional adhesive (not shown) or other equivalent fastening means. These ends 30 may also be secured to the cores 20 in the same manner. In the base 28 of each of the channels 26 there is preferably formed an elongated groove 32 of uniform cross-sectional configuration. The grooves 32 shown extend the lengths of the panels 14, 16 or 18 upon which they are located. It will be seen from an examination of the drawings that they face outwardly, away from these panels. Within the base 28 of each of the grooves 32 there are located a plurality of equally spaced and equally dimensioned openings 34; each of the openings 34 is intersected by two comparatively short slots 36. These slots are located within the deepest portions of the grooves 32 within which they are formed; they extend from the openings 34 in the same direction as the grooves 32.

The joints 10 and 12 both employ a connecting structure 38 as is shown in FIGURE 3 of the drawing. From an examination of this figure it will be seen that a connecting structure 38 utilizes a rigid tube 40 having cross-slots 42 located at its ends. Adjacent to but spaced from one of these ends the tube carries locking arms 44, each of which has a hooked end 46. The arms 44 preferably extend from the tube 40 in a plane perpendicular to the axis of this tube. Preferably the arms 44 are made integrally with the tube 40. In the connecting structure 38 a bolt 48 extends through the tube 40. The head 50 of this bolt has the shape of a cross-bar, and is preferably dimensioned so as to be capable of fitting within the cross-slots 42. The other end of the bolt 48 preferably carries a conventional washer 52 and nut 54.

In the joint 10, a plurality of the connecting structures 38 are employed in order to lock the roof panels 14 and the wall panels 16 with respect to one another through the use of a roof support channel 56. This channel 56 has what can be most easily described as a modified U-shape. It includes side flanges 58 which are designed to engage and support the roof panels 14 and bottom flanges 60 which are designed to engage the sides of the wall panels 16 so as to prevent movement of this last panel. In the sides 62 of the roof channel 56 there are located a plurality of equally spaced and equally dimensioned openings 64 corresponding to the openings 34 previously described. Each of the openings 64 is also intersected by two slots 66 corresponding to the slots 36 previously described. The base 68 of the roof channel 56 is also provided with other similar openings 64 and slots 66. These openings 64 and slots 66 in the roof channel are located in sets of three disposed adjacent to one another in a common plane perpendicular to the length of the roof channel 56.

Figure 2:
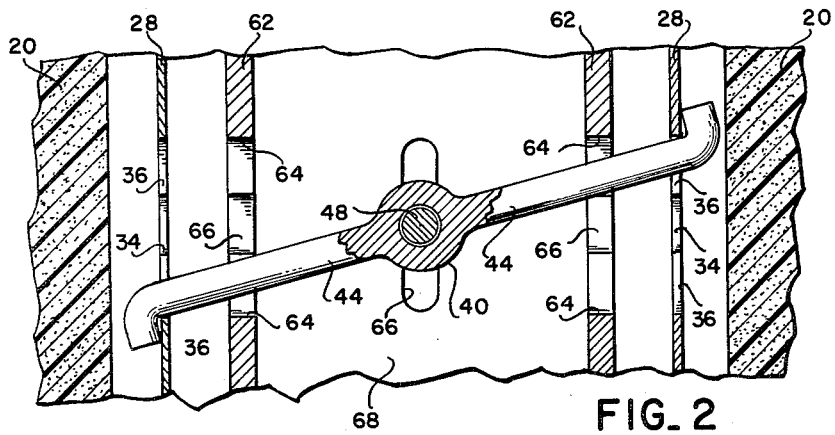
FIGURE 2 is a cross-sectional view taken at line 2—2 of FIGURE 1.

In forming the joint 10, the panels 14 and 16 are located with respect to the roof channel 56 as shown. Next, a connecting structure 38 is inserted within the channel 56 with bolt head 50 located within the slots 42. The tube 40 of this structure 38 is twisted so that the arms 44 and hook ends 46 project through slots 66 and 36 as indicated in FIGURE 2 of the drawings. This brings the hook ends 46 into contact with the interiors of the channels 26 on the roof panels 14. At this point the bolt 48 is manipulated so as to have its head 50 through the groove 32 in the panel 16 into a position in which it engages the interior of the channel 26 adjacent to an opening 34. The nut 50 is then tightened. As it is tightened, the head 50 will be pulled into engagement with the portion of the channel 26 in the wall panel 16 surrounding the opening 34. This will "tighten" the entire assembly so as to prevent the panels 14 and 16 from moving with respect to one another.

Figure 4:
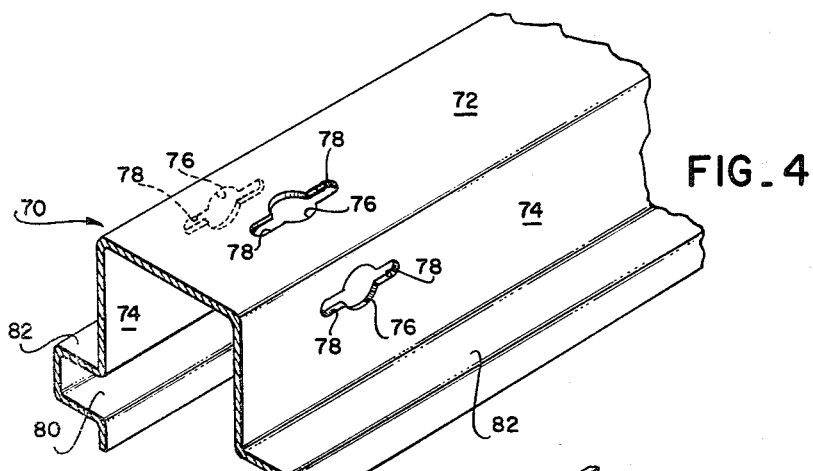
FIGURES 4 and 5 are isometric views showing the construction of channels as are shown in FIGURE 1.
Figure 5:
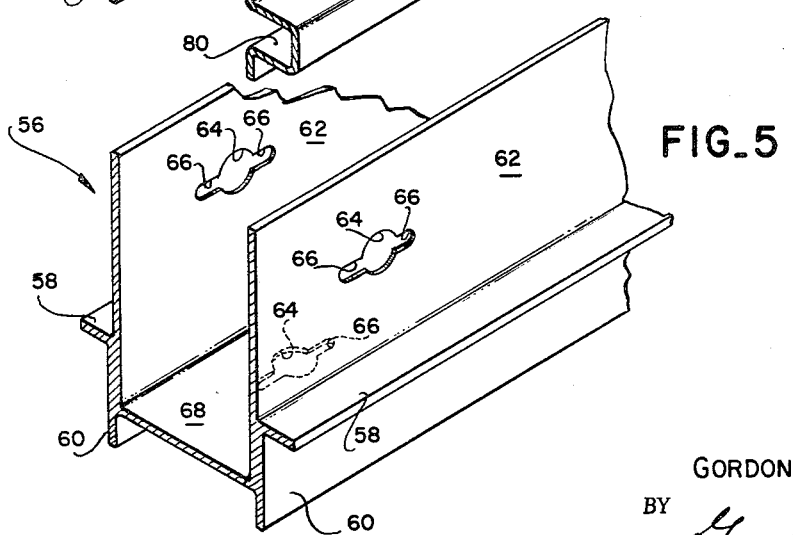

The joint 12 is essentially very similar to the joint 10 previously described. It differs from the joint 10 by utilizing what is referred to as a floor support channel 70 as shown in FIGURE 4 of the drawings. This channel 70 may be described as being of an inverted U-shape, and has a base or central portion 72 connected to sides 74. Within the base 72 and the sides 74 there are located openings 76 corresponding to the openings 34 and 64 previously described and slots 78 corresponding to the slots 36 and 66 previously described. In the floor channel 70 projecting longitudinal grooves 80 are provided in the sides 74. These grooves 80 create on the exterior of the floor channel 70 flat surfaces 82 which are parallel to the base 72.

These surfaces 82 are employed so as to support the floor panels 18. Preferably the sides 74 are dimensioned so that these floor panels 18 extend beyond the base 72 of the floor channel 70 when so assembled. This enables the channels 26 on the floor panels 18 to fit against the side members 22 on the wall panels 16 in order to position this wall panel 16 upon the base 72 of the channel 70. In completing a joint such as the joint 12 a connecting structure 38 is used after the bolt 48 in it has been turned around with respect to the tube 40 from the position shown in FIGURE 3. Since a connecting structure 38 is used in the joint 12 in the same manner as it is employed in the joint 10 the attaching of it is not separately described herein.

From a careful consideration of the foregoing it will be realized that the various openings 34, 64 and 76 in the panels 14, 16 and 18 and in the channels 56 and 70 are all preferably spaced the same distance apart. It will also be realized that a plurality of connecting structures 38 are employed along the lengths of the joints 10 and 12.

One major advantage of the connecting structures and assemblies or joints as herein indicated lies in the simplicity of these structures. The connecting structures 38 may be manufactured at a comparatively nominal cost. They only require the tightening of a single nut for their use. Further, as they are used in connection with the channels 56 and 70 there is virtually no problem of assembly because of the simplicity of the type of construction involved. Another advantage of the structures set forth herein lies in the fact that they may be disassembled as easily as they are assembled. In spite of this simplicity the connecting assemblies or joints constructed as described in this specification are sufficiently strong so as to be used for building or other purposes.

Having described only typical forms of the invention I do not wish to be limited to the specific details herein set forth, but wish to reserve to myself any variations or modifications that may appear to those skilled in the art and fall within the scope of the following claims.

What is claimed is:

1. A connecting joint which includes:
   (a) connecting channel means, said channel means having two side surfaces connected by a third surface, said surfaces having a plurality of openings formed in the walls thereof;
   (b) a wall panel having an edge located against said third surface;
   (c) another wall panel having an edge located against one of said side surfaces;
   (d) a rigid tube positioned within the interior of said connecting channel means;
   (e) means for engaging said other wall panel attached to said tube so as to extend therefrom through an opening in one of said side surfaces, said means for engaging being in contact with said other wall panel so as to hold said other wall panel with respect to said connecting channel means;
   (f) bolt means extending through said tube and through an opening in said third surface of said connecting channel means,, said bolt means having a head engaging said first mentioned wall panel so as to hold said first mentioned wall panel against said third surface; and
   (g) nut means located on said bolt means so as to secure said bolt means and first mentioned wall panel with respect to said connecting channel and said tube.

2. A connecting joint as defined in claim 1 including a further panel having an edge located against the other side, and including means for engaging said further panel attached to said tube so as to extend therefrom through an opening in the other of said side surfaces, said means for engaging being in contact with said further wall panel so as to hold said further wall panel with respect to said connecting channel means.

3. A connecting joint as defined in claim 2 wherein each of said means for engaging is an arm extending from said tube, the ends of said arms being hooked.

4. A connecting joint as defined in claim 1 including support members formed on each of said side surfaces so as to extend outwardly therefrom and wherein said other wall panel is located against the exterior of said support members.

5. A connecting joint as defined in claim 1 wherein said connecting channel means has a U-shape and wherein said connecting channel means includes outwardly extending side flanges and bottom flanges, and wherein one of said side flanges supports said other wall and said bottom flanges engage said first mentioned wall panel.

6. A connecting structure which includes:
(a) a rigid tube having ends adapted for abuttably contacting adjacent structure;
(b) a pair of locking arms attached to said tube so as to extend from opposite sides of said tube in a plane perpendicular to the axis of said tube, each of said arms having a hooked end;
(c) a bolt having a head shaped as a cross-bar extending through said tube; and
(d) nut means located on said bolt.
7. A connecting structure as defined in claim 6 wherein said arms are located closer to one end of said tube than to the other end of said tube.

References Cited by the Examiner
UNITED STATES PATENTS

| | | | |
|---|---|---|---|
| 1,638,671 | 8/27 | Wagner | 189—35 |
| 2,982,380 | 5/61 | Rose | 189—34 |
| 3,120,031 | 2/64 | Bohnsack | 189—36 XR |

HARRISON R. MOSELEY, *Primary Examiner.*